(12) United States Patent
Haller

(10) Patent No.: US 9,371,882 B2
(45) Date of Patent: Jun. 21, 2016

(54) SHOCK ABSORBER

(71) Applicant: GRAMMER AG, Amberg (DE)

(72) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 14/468,977

(22) Filed: Aug. 26, 2014

(65) Prior Publication Data
US 2015/0090549 A1 Apr. 2, 2015

(30) Foreign Application Priority Data
Oct. 1, 2013 (DE) .......................... 10 2013 110 919

(51) Int. Cl.
| F16F 9/50 | (2006.01) |
| F16F 9/18 | (2006.01) |
| F16F 9/34 | (2006.01) |
| B60N 2/50 | (2006.01) |
| B60N 2/52 | (2006.01) |
| B60G 13/00 | (2006.01) |
| B60G 99/00 | (2010.01) |

(52) U.S. Cl.
CPC . *F16F 9/50* (2013.01); *B60G 13/00* (2013.01); *B60G 99/002* (2013.01); *B60N 2/501* (2013.01); *B60N 2/502* (2013.01); *B60N 2/505* (2013.01); *B60N 2/508* (2013.01); *B60N 2/522* (2013.01); *B60N 2/527* (2013.01); *F16F 9/185* (2013.01); *F16F 9/34* (2013.01); *B60G 2202/24* (2013.01); *B60G 2202/413* (2013.01); *B60G 2202/416* (2013.01); *B60G 2500/10* (2013.01); *B60G 2500/11* (2013.01); *B60G 2500/30* (2013.01)

(58) Field of Classification Search
CPC ............... F16F 9/50; F16F 9/18; F16F 9/185; F16F 9/187; F16F 9/34
See application file for complete search history.

(56) References Cited

U.S. PATENT DOCUMENTS

| 1,908,902 A | 5/1933 | Knoll |
| 2,725,078 A | 11/1955 | Glancy |

(Continued)

FOREIGN PATENT DOCUMENTS

| CH | 138281 | 2/1930 |
| DE | 1287453 | 1/1969 |

(Continued)

OTHER PUBLICATIONS

Official Action for German Patent Application No. 102013110919.5, dated Jul. 7, 2014, 3 pages.

(Continued)

*Primary Examiner* — Vishal Sahni
(74) *Attorney, Agent, or Firm* — Sheridan Ross P.C.

(57) ABSTRACT

A shock absorber is provided having a housing, an inner tube, a piston rod, a piston which divides the interior of the inner tube into a lower chamber and an upper chamber, a first valve arrangement on the piston, a second valve arrangement at the upper end of the inner tube, and a third valve arrangement at the lower end of the inner tube. The shock absorber includes a first connection element on the lower chamber of the inner tube and a second connection element on the upper chamber of the inner tube, to connect a means for controlling the flow resistance of the working medium in the first valve arrangement and an ascending pipe which projects into the working medium received in the housing and by which working medium can be transferred from the housing acting as a tank into the upper chamber of the inner tube.

9 Claims, 6 Drawing Sheets

(56) References Cited

U.S. PATENT DOCUMENTS

| | | | |
|---|---|---|---|
| 3,148,869 A | 9/1964 | Peterson | |
| 3,470,692 A | 10/1969 | Kamp | |
| 3,480,293 A | 11/1969 | Vogel et al. | |
| 3,596,895 A | 8/1971 | Hirtreiter | |
| 3,732,944 A | 5/1973 | Kendall | |
| 3,938,770 A | 2/1976 | Turner et al. | |
| 4,087,069 A | 5/1978 | Hall et al. | |
| 4,139,186 A * | 2/1979 | Postema et al. | 188/322.19 |
| 4,418,955 A | 12/1983 | Muncke et al. | |
| 4,497,078 A | 2/1985 | Vogel et al. | |
| 4,502,673 A | 3/1985 | Clark | |
| 4,526,258 A | 7/1985 | Huber | |
| 4,531,761 A | 7/1985 | von Sivers | |
| 4,733,847 A | 3/1988 | Grassl | |
| 4,936,423 A * | 6/1990 | Karnopp | 188/266.5 |
| 5,169,112 A | 12/1992 | Boyles et al. | |
| 5,273,240 A | 12/1993 | Sharon | |
| 5,290,089 A | 3/1994 | Oleszko et al. | |
| 5,294,085 A | 3/1994 | Lloyd et al. | |
| 5,538,117 A | 7/1996 | Bouchez | |
| 5,871,257 A | 2/1999 | Dundes, Sr. | |
| 5,876,085 A | 3/1999 | Hill | |
| 6,120,082 A | 9/2000 | Vandermolen | |
| 6,467,748 B1 | 10/2002 | Schick et al. | |
| 6,857,674 B2 | 2/2005 | Chareyre | |
| 7,341,645 B2 | 3/2008 | Fong | |
| 7,568,675 B2 | 8/2009 | Catton | |
| 7,699,147 B2 * | 4/2010 | Preukschat et al. | 188/282.4 |
| 8,342,541 B2 | 1/2013 | Wurmthaler et al. | |
| 8,439,420 B2 | 5/2013 | Cantor et al. | |
| 8,632,061 B2 | 1/2014 | Nemoto | |
| 9,120,410 B2 | 9/2015 | Bauman | |
| 9,140,328 B2 | 9/2015 | Lorey | |
| 9,248,768 B2 | 2/2016 | Kolb | |
| 2001/0015565 A1 | 8/2001 | Motozawa et al. | |
| 2002/0145315 A1 | 10/2002 | Fraley et al. | |
| 2004/0112659 A1 | 6/2004 | Kramer et al. | |
| 2004/0251097 A1 | 12/2004 | Barbison et al. | |
| 2007/0084687 A1 | 4/2007 | Foster et al. | |
| 2008/0156602 A1 | 7/2008 | Hiemenz et al. | |
| 2009/0134595 A1 | 5/2009 | Haller et al. | |
| 2009/0218867 A1 | 9/2009 | Clark | |
| 2010/0072760 A1 * | 3/2010 | Anderson et al. | 290/1 R |
| 2010/0117411 A1 | 5/2010 | Fujita et al. | |
| 2010/0181708 A1 | 7/2010 | Kolb et al. | |
| 2010/0276959 A1 | 11/2010 | Jang | |
| 2011/0001342 A1 | 1/2011 | Deml et al. | |
| 2011/0006567 A1 | 1/2011 | Mullen | |
| 2011/0018316 A1 | 1/2011 | Meredith et al. | |
| 2011/0277433 A1 | 11/2011 | Sugden et al. | |
| 2011/0278894 A1 | 11/2011 | Lorey | |
| 2011/0298266 A1 | 12/2011 | Haller | |
| 2012/0007293 A1 | 1/2012 | Bauer et al. | |
| 2012/0025577 A1 | 2/2012 | Kolb | |
| 2012/0091679 A1 | 4/2012 | Kashi et al. | |
| 2012/0091773 A1 | 4/2012 | Lorey | |
| 2012/0145875 A1 | 6/2012 | Haller et al. | |
| 2012/0153689 A1 | 6/2012 | Haller et al. | |
| 2012/0153695 A1 | 6/2012 | Haller et al. | |
| 2013/0112839 A1 | 5/2013 | Kato et al. | |
| 2013/0161138 A1 * | 6/2013 | Barefoot | 188/282.1 |
| 2013/0341484 A1 | 12/2013 | Yamada et al. | |
| 2014/0354027 A1 | 12/2014 | Kolb | |
| 2015/0001771 A1 | 1/2015 | Lorey | |
| 2015/0165933 A1 | 6/2015 | Kolb | |

FOREIGN PATENT DOCUMENTS

| | | |
|---|---|---|
| DE | 2016973 | 10/1970 |
| DE | 2756624 | 6/1979 |
| DE | 141769 | 5/1980 |
| DE | 2059720 | 6/1980 |
| DE | 3517345 | 11/1986 |
| DE | 3517505 | 11/1986 |
| DE | 3831724 | 3/1990 |
| DE | 3930612 | 3/1991 |
| DE | 4037289 | 5/1992 |
| DE | 3686619 | 4/1993 |
| DE | 4216987 | 7/1993 |
| DE | 3785493 | 10/1993 |
| DE | 19938698 | 2/2001 |
| DE | 20116588 | 5/2002 |
| DE | 10306564 | 8/2004 |
| DE | 102004013308 | 12/2005 |
| DE | 60116693 | 7/2006 |
| DE | 102005011856 | 8/2006 |
| DE | 102005048949 | 12/2006 |
| DE | 102006016140 | 10/2007 |
| DE | 102007039215 | 2/2009 |
| DE | 202007013300 | 2/2009 |
| DE | 102008016685 | 6/2009 |
| DE | 102008020865 | 11/2009 |
| DE | 102008050142 | 3/2010 |
| DE | 102008037547 | 5/2010 |
| DE | 102009022763 | 12/2010 |
| DE | 202011005606 | 12/2011 |
| DE | 102010033419 | 2/2012 |
| DE | 102010037842 | 3/2012 |
| DE | 102010051325 | 5/2012 |
| DE | 102010055342 | 6/2012 |
| DE | 102010055344 | 6/2012 |
| DE | 102011100307 | 11/2012 |
| DE | 102011085879 | 5/2013 |
| EP | 0322608 | 7/1989 |
| EP | 1186467 | 3/2002 |
| EP | 1464866 | 10/2004 |
| EP | 1643155 | 4/2006 |
| EP | 2468568 | 4/2006 |
| EP | 2062758 | 5/2009 |
| EP | 2468567 | 6/2012 |
| FR | 1081491 | 12/1954 |
| FR | 1364719 | 6/2012 |
| GB | 1295410 | 11/1972 |
| JP | S62-18346 | 1/1987 |
| JP | S62-18347 | 1/1987 |
| WO | WO 91/04168 | 4/1991 |
| WO | WO 99/33676 | 7/1999 |

OTHER PUBLICATIONS

Extended European Search Report for European Patent Application No. 14180567.1, dated Feb. 19, 2015, 9 pages.
U.S. Appl. No. 14/915,754, filed Mar. 1, 2016, Haller.
Notice of Allowance for U.S. Appl. No. 14/276,122, mailed Jun. 17, 2015, 9 pages.
Official Action for U.S. Appl. No. 14/294,356, mailed Jun. 8, 2015, 15 pages.
Official Action for U.S. Appl. No. 14/294,356, mailed Sep. 24, 2015, 17 pages.
Notice of Allowance for U.S. Appl. No. 14/294,356, mailed Nov. 30, 2015, 16 pages.
Official Action for U.S. Appl. No. 14/314,719, mailed Sep. 30, 2015, 7 pages.

* cited by examiner

SHOCK ABSORBER

CROSS-REFERENCE TO RELATED APPLICATIONS

This application claims the benefit of German Patent Application No. DE 10 2013 110 919.5 filed Oct. 1, 2013, the entire disclosure of which is incorporated herein by reference.

FIELD

The invention relates to a shock absorber.

BACKGROUND

A shock absorber of this type is illustrated by way of example in FIG. 1. This shock absorber of the prior art has a housing with an inner tube arranged therein, a piston rod immersing into the inner tube, and arranged on the end of the piston rod immersing into the inner tube is a piston which divides the interior of the inner tube into a lower chamber and an upper chamber. In this respect, arranged on the piston is a valve arrangement by which a working medium received in the inner tube can flow out of the lower chamber into the upper chamber and vice versa as the piston travels in the inner tube. Arranged at the upper end of the inner tube is a second valve arrangement by which the working medium received in the inner tube can only flow out of the upper chamber into the interior of the housing acting as a tank for the working medium, as the piston travels in the inner tube. Finally, at its lower end, the inner tube has a third valve arrangement by which the working medium received in the interior of the housing acting as a tank can only flow into the lower chamber of the inner tube as the piston travels in the inner tube.

Prior art shock absorbers of this type are usually known as twin tube shock absorbers. Such twin tube shock absorbers are used as passive shock absorbers, on the one hand as non-adjustable shock absorbers and, on the other, as adjustable shock absorbers.

In the case of a non-adjustable twin tube shock absorber, the characteristics of the shock absorber or of the damping respectively are firmly defined, so that the flow resistance of the working medium is fixed by the valve arrangements used in the shock absorber.

Adjustable twin tube shock absorbers are used when the work to be performed by the shock absorber is to be adapted to corresponding states of a vehicle in which an adjustable twin tube shock absorber of this type is fitted, or respectively to sprung, different-sized masses. In the case of passive hydraulically adjustable twin tube shock absorbers of this type, this is achieved in that the flow resistance can be changed by a variable valve bore in the valve arrangement between the upper chamber and the lower chamber of the inner tube of the shock absorber, which valve arrangement is arranged on the piston.

A further feature of passive, non-adjustable shock absorbers is that the quantity of oil exchanged at a defined working stroke is always the same. The flow resistance depends only on the speed of the piston inside the inner tube.

In the case of passive, adjustable shock absorbers, likewise at an identically defined stroke, the flow resistance is influenced by the alteration of the valve cross section of the valve arrangement in the piston, in addition to the speed of the piston. The exchanged quantity of oil is also the same at a defined stroke.

In the following, the mode of operation of a twin tube shock absorber of this type according to the prior art will be briefly described.

When the shock absorber moves in, the piston in the inner tube moves downwards so that the lower chamber of the inner tube decreases in volume, while the upper chamber of the inner tube increases in volume. During this moving-in action of the shock absorber, a particular quantity of oil, serving here as the working medium, is guided by the valve arrangement of the piston from the lower chamber into the upper chamber and, as a result, a defined flow resistance is produced via the valve arrangement of the piston by the speed of the piston. The quantity of oil in the upper chamber of the inner tube, which oil also displaced by the immersion of the piston rod, is diverted into the housing acting as a tank for the working medium or oil respectively by the valve arrangement arranged at the upper end of the inner tube.

When the moving-out action of the shock absorber is initiated, the piston moves upwards inside the inner tube due to a reduction in volume in the upper chamber and an increase in volume in the lower chamber, the quantity of oil or working medium respectively to be exchanged being guided from the upper chamber into the inward of the housing acting as a tank for the working medium respectively into the oil sump there by the valve arrangement at the upper end of the inner tube. The difference in quantity of oil or working medium respectively required by the moving-out motion of the piston rod is subsequently suctioned up by the valve arrangement arranged at the base of the housing acting as a tank for the working medium respectively into the oil sump there.

As just illustrated, the working medium or oil respectively moves in a circuit in the shock absorber.

Since a twin tube shock absorber of this type has to be prefabricated accordingly for its passively adjustable or passively non-adjustable use, it is not possible to use a shock absorber provided on one occasion for a different application purpose.

SUMMARY

It is therefore the object of the invention to provide a shock absorber of the type mentioned at the outset, with the aid of which different application purposes can be realised.

This object is achieved by a shock absorber having the features of claim 1. Advantageous configurations of the shock absorber according to the invention are set out in the subclaims.

In addition to the features of the preamble of claim 1, the shock absorber according to the invention also has the features that, provided on the lower chamber of the inner tube, is a first connection element and, provided on the upper chamber of the inner tube, is a second connection element, to connect a means for controlling the flow resistance of the working medium in the first valve arrangement, and that on the upper end of the inner tube an ascending pipe is arranged, which protrudes into the working medium or oil respectively received by the housing, and by which the working medium or oil respectively is transferable from the housing acting as a tank into the upper chamber of the inner tube.

Due to the configuration according to the invention of the shock absorber, a means for controlling the flow resistance of the working medium in the valve arrangement of the piston can be implemented at the connections to the lower and upper chambers. It is thereby possible to use the shock absorber according to the invention for different application purposes and also to build it up in modules. If a means for controlling the flow resistance of the working medium in the valve arrangement of the piston is not arranged at the additional connections on the upper and lower chambers, then the shock absorber can be operated passively and non-adjustably like a customary shock absorber when the additional connections are closed. However, if a control means of this type is connected to the additional connections of the lower and upper chambers, and these connections are now open and are connected to allow the working medium or oil respectively to pass through, the shock absorber according to the invention can then be operated in a passively adjustable manner, in an actively adjustable manner, in a semi-actively adjustable manner and adaptively via an appropriate activation of the means for controlling the flow resistance of the working medium in the valve arrangement of the piston. In particular, the ascending pipe serves the purpose to prevent a cavitation during an external operation, at which the quantity of working medium or oil respectively may be exchanged between the lower chamber and the upper chamber by a hydraulic pump. In any circumstance thereby by means of the ascending pipe a closed oil circuit between the upper and the lower chambers is ensured. Therefore no cavitation may be generated by an external operation of the shock absorber, at which the quantity of oil is exchanged between the lower chamber and the upper chamber for example by a hydraulic pump. Cavitations of this type would be disadvantageous to the mode of operation of the shock absorber. Furthermore, even during external operation, this ascending pipe 1 guarantees the provision of a closed oil circuit.

Such shock absorbers according to the invention can be used not only in the wheel suspension and suspension struts of highly diverse vehicles. In fact, it is also possible to use these shock absorbers to damp vibrations of seats, in particular of sprung vehicle seats and sprung cabins. Furthermore, combining a damping of a cabin suspension and sprung vehicle seats, for example the seats of a rail vehicle, is possible. Nor is the use of the shock absorbers according to the invention restricted to uses of this type: they can be used in all possible devices for which a corresponding damping of vibrations is desirable.

According to a first advantageous configuration of the invention, provided as the means for controlling the flow resistance of the working medium in the valve arrangement of the piston, is a magnetic valve which is arranged between a pressure line connected to the lower connection element and a pressure line connected to the upper connection element. This configuration allows two types of damping of the shock absorber to be realised. These are firstly a hard damping, for which the magnetic valve is closed, so that the shock absorber according to the invention is still operated as a passively, non-adjustable shock absorber. When the magnetic valve is opened, an additional exchange of working medium or oil respectively can take place between the upper chamber of the inner tube and the lower chamber of the inner tube, so that the flow rate of the working medium is altered by the valve arrangement of the piston and thus a softer damping takes place. Therefore, also when the magnetic valve is open, the shock absorber is operated in a passively non-adjustable manner. However, due to the two adjustment options of "magnetic valve closed" and "magnetic valve open", it is possible to change over between a hard damping and a soft damping.

According to a further particularly advantageous configuration of the invention, provided as the means for controlling the flow resistance of the working medium in the valve arrangement of the piston, is a proportional flow regulation valve which is arranged between a pressure line connected to the lower connection element and a pressure line connected to the upper connection element. Due to this proportional flow valve, it is possible, between the states of the proportional flow control valve being fully closed and fully open, to continuously vary the flow rate in the pressure lines between the upper connection element and the proportional flow control valve and the lower pressure line and the proportional flow control valve. An adjustable, continuous damping is thereby possible, due to which it is not only possible to choose between a hard damping and a soft damping, but also between all damping values therebetween.

According to another concept of the invention, provided as the means for controlling the flow resistance of the working medium in the valve arrangement of the piston, is a hydraulic pump drive which is arranged between a pressure line connected to the lower connection element and a pressure line connected to the upper connection element. A hydraulic pump drive of this type can increase and/or decrease the quantity of working medium or oil respectively exchanged during a defined travel of the piston in the inner tube. This configuration makes it possible to control the level of the shock absorber in addition to increasing or decreasing respectively the shock absorber forces. In the case of a seat, particularly in the case of the driver's seat of a rail vehicle, a configuration of this type can also be used in particular to correct the height of the seat or respectively otherwise also for a temporary leveling.

Of course, it is also possible to provide as the means for controlling the flow resistance of the working medium in the valve arrangement of the piston a hydraulic pump drive combined with a valve system, in particular a magnetic valve or a proportional flow regulation valve. As a result, the advantages and possible uses described above for the individual means can be used combined together.

Furthermore, it has proved to be advantageous for the hydraulic pump drive to have a controllable pump and a motor for the pump.

Since during the operation of a pump, corresponding leaks always have to be taken into account, particularly when the pump operates at high pressures, a leakage line for the working medium is provided between the housing acting as a tank for the working medium and the hydraulic pump drive, in particular the controllable pump. A leakage line of this type can return the working medium or oil issuing at the pump back into the tank, thereby reducing the consumption of working medium or oil respectively of the shock absorber according to the invention and avoiding environmental pollution.

To equalise the pressure, a re-suctioning line for the working medium can also be provided between the housing acting as a tank for the working medium and the lower pressure line and/or the upper pressure line. This re-suctioning line can also be separated from the lower pressure line and/or from the upper pressure line by non-return valves.

Further objectives, advantages, features and possible uses of the present invention will be revealed from the following description of embodiments with reference to the drawings. In this respect, all the described and/or illustrated features form, per se or in any sensible combination, the subject-matter of the present invention, also irrespective of their summarisation in the claims or of their back-references.

DETAILED DESCRIPTION

Figure 2:
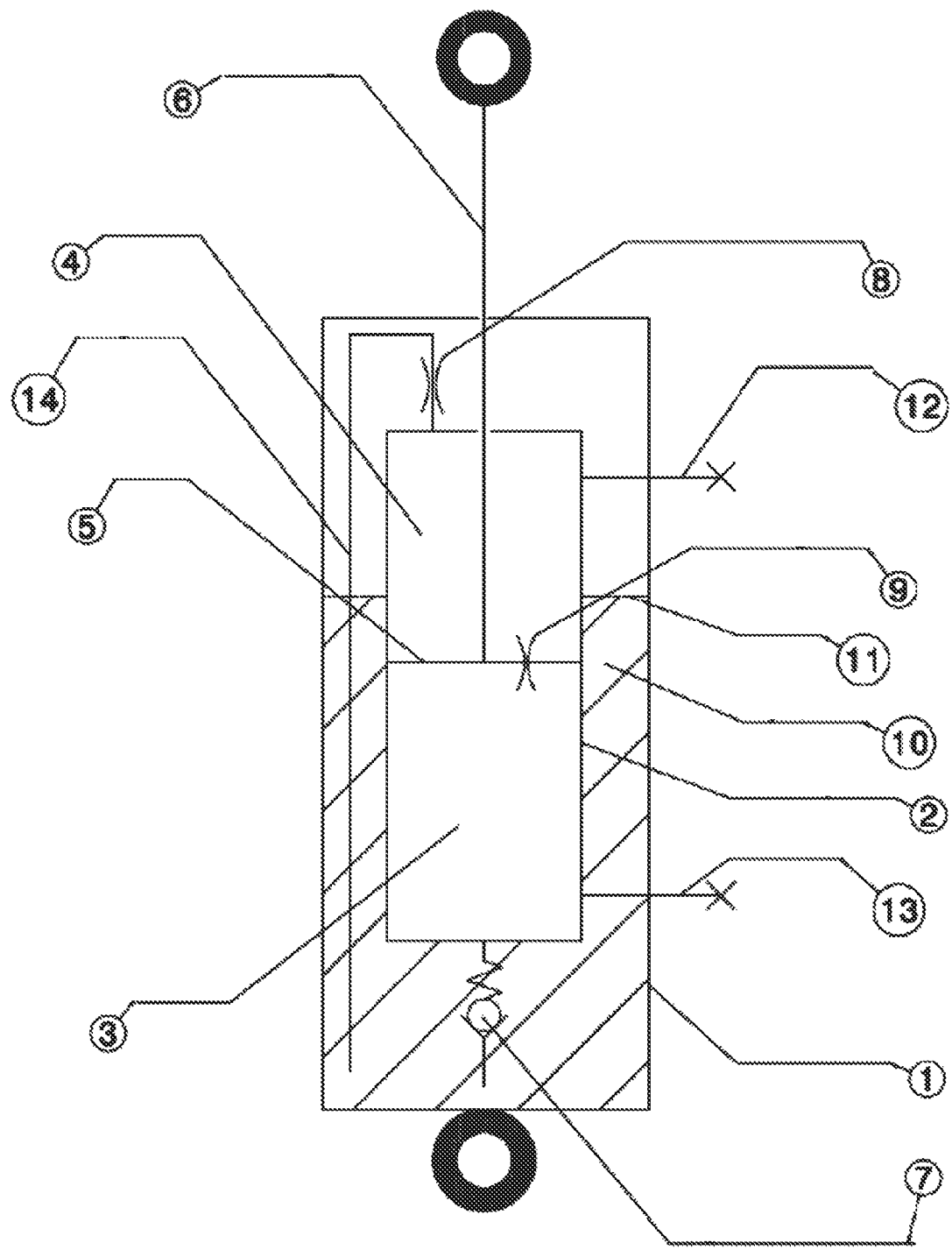
FIG. 2 shows a first embodiment of a shock absorber according to the invention.

FIG. 2 shows a first embodiment of a shock absorber according to the invention. The shock absorber substantially consists of a tubular housing 1 in which an inner tube 2 is arranged in a stationary manner. A piston 5 can be moved upwards and downwards in the inner tube 2 by a piston rod 6, the inner tube 2 being divided by the piston 5 into an upper chamber 4 and a lower chamber 3. Thereby the inner tube 2 is completely filled with a working medium, preferably with oil. A first valve arrangement 9 is fitted in the piston 5. This valve arrangement 9 is configured such that the oil can pass through it in both directions. Since oil is also displaced by the piston rod 6 as the piston 5 moves downwards from above in the inner tube 2, the oil must have an opportunity to escape out of the upper chamber 4. For this purpose, arranged at the upper end of the inner tube 2 is a second valve arrangement 8, through which oil can escape out of the upper chamber into the container 1 serving as a tank. In this respect, the valve arrangement 8 is configured to allow the oil to pass only in this direction. The passage of oil out of the container 1 into the upper chamber 4 of the inner tube 2 is impossible due to the valve arrangement 8. Since the lower chamber 3 undergoes an increase in volume as the piston 5 moves upwards from below in the inner tube 2, while the upper chamber undergoes a decrease in volume, a third valve arrangement 7 is provided at the lower end of the inner tube 2. This makes it possible for oil to pass into the lower chamber 3 of the inner tube 2 out of the container 1 in which it is stored, while due to the reduction in volume of the upper chamber 4, oil present therein passes via the valve arrangement 8 into the container 1.

Figure 1:
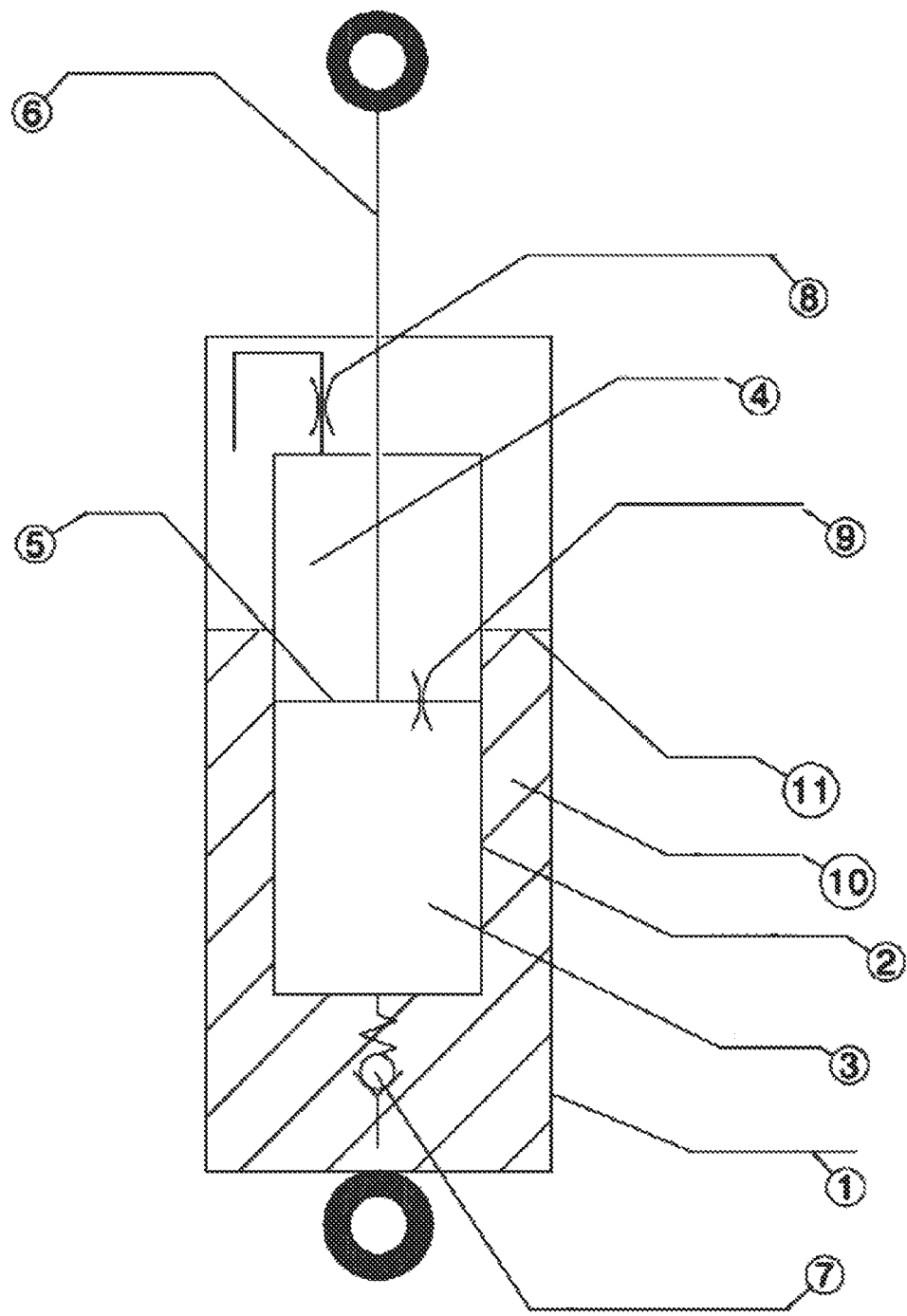
FIG. 1 shows a shock absorber according to the prior art.

This embodiment also has a connection element 12 on the upper chamber 4 of the inner tube 2 and the lower chamber 3 of the inner tube 2 has a connection element 13. In the illustration of FIG. 2, the connection elements 12 and 13 are shut, so that consequently no working medium or oil respectively can pass out of the inner tube 2 or into the inner tube 2 respectively. In this configuration of the embodiment, the shock absorber according to the invention operates in a passive, non-adjustable manner which is identical to that of the shock absorber according to the prior art shown in FIG. 1.

However, it is possible to connect to the connection elements 12 and 13 a means for controlling the flow resistance of the working medium or oil respectively in the valve arrangement 9 on the piston 5. In a first configuration, this means can be for example a magnetic valve which can be characterised by two defined states, namely by "open" and "closed". A magnetic valve of this type can vary the flow resistance of the working medium or oil respectively inside the valve arrangement 9 of the piston 5 between a hard damping and a soft damping. Hard damping occurs when the magnetic valve is closed, whereas a soft damping is provided when the magnetic valve is open. When the magnetic valve is open, the flow resistance inside the valve arrangement 9 is altered because the working medium or oil respectively located in the inner tube 2 is now also able to pass through the connection element 12 on the upper chamber 4, through the magnetic valve, through the connection element 13 and into the lower chamber 3. As a result, an oil equalisation or working medium equalisation respectively takes place between the upper chamber and lower chamber, which occurs both during the downwards movement of the piston 5 and during the upwards movement of the piston 5 inside the inner tube 2.

Further, the embodiment of FIG. 2 has, arranged at the upper end of the inner tube 2, an ascending pipe 14 which projects above an oil sump level 11 into the oil sump 10 inside the container 1. This ascending main 14 is used so that during an external operation of the shock absorber, during which the quantity of oil is exchanged between the lower chamber 3 and the upper chamber 4 by a hydraulic pump, no cavitation occurs. Cavitations of this type would be disadvantageous to the mode of operation of the shock absorber. Furthermore, even during external operation, this ascending pipe 14 guarantees the provision of a closed oil circuit.

Figure 3:
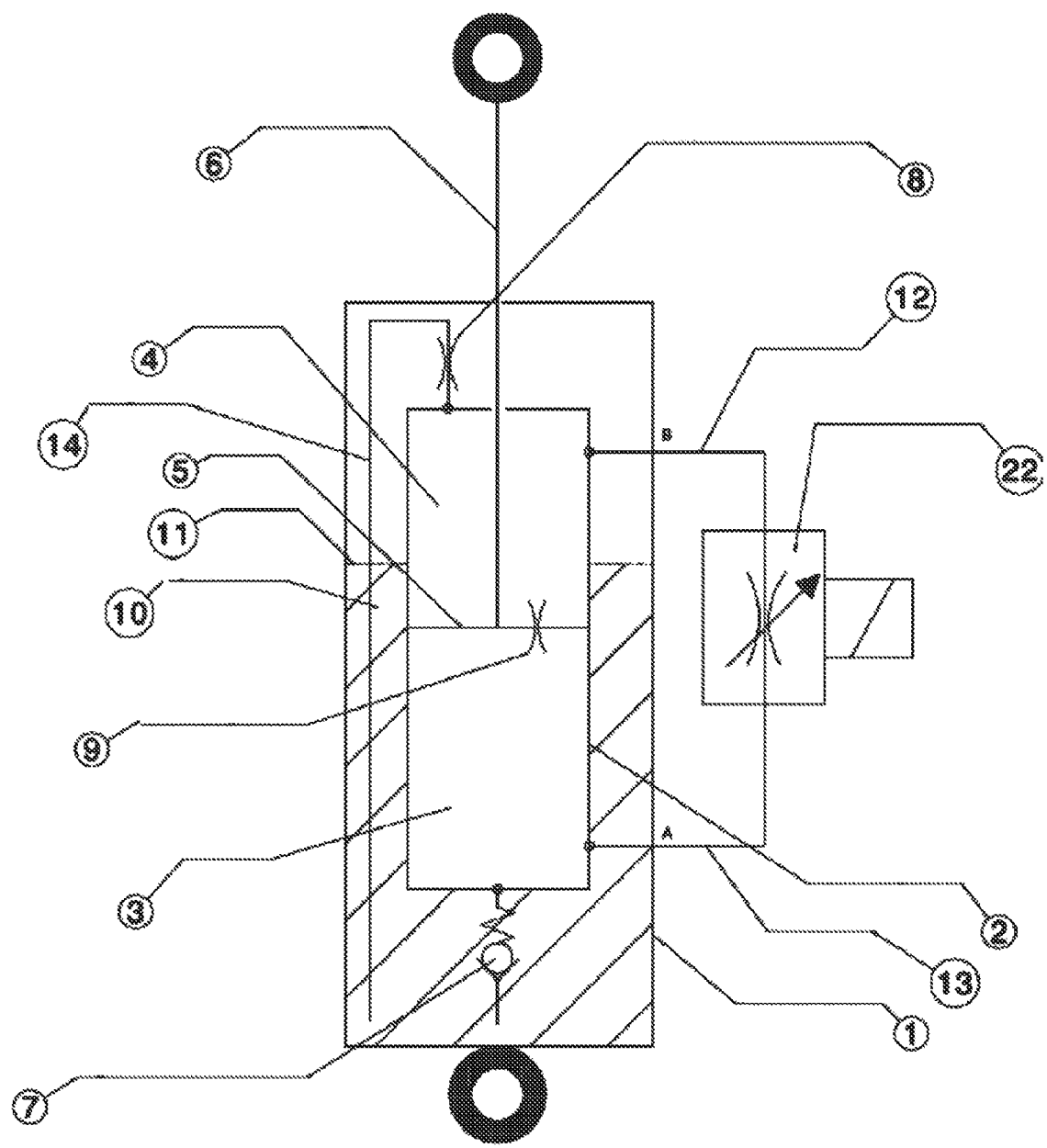
FIG. 3 shows a second embodiment of a shock absorber according to the invention.

FIG. 3 shows a further embodiment of a shock absorber according to the invention. Here, provided as the means for controlling the flow resistance of the working medium in the valve arrangement 9 of the piston 5, is a proportional flow regulation valve 22 which is arranged between a pressure line 18 connected to the lower connection element 13 and a pressure line 17 connected to the upper connection element 12. By means of a proportional flow regulation valve 22 of this type, it is possible to regulate the flow resistance of the oil therein subject to the flow strength. In this respect, it is thereby possible to adapt the power of the shock absorber and thereby the damping according to the necessary load cases via this proportional flow regulation valve 22. A passive basic adjustment of the shock absorber is provided here as a hard adjustment, the shock absorber producing its highest power in this state without any working medium flow. Activation of the proportional flow regulation valve 22 causes a reduction in the shock absorber forces, since a particular proportion of the oil exchange between chamber 3 and chamber 4 is diverted by the pressure lines 17 and 18 and the proportional flow regulation valve 22. The greater the strength of flow, the greater the quantity of oil which can flow through the proportional flow regulation valve 22, so that the shock absorber can be adjusted more softly with increasing flow strength. Therefore, the shock absorber can be operated both semi-actively and passively.

Figure 4:
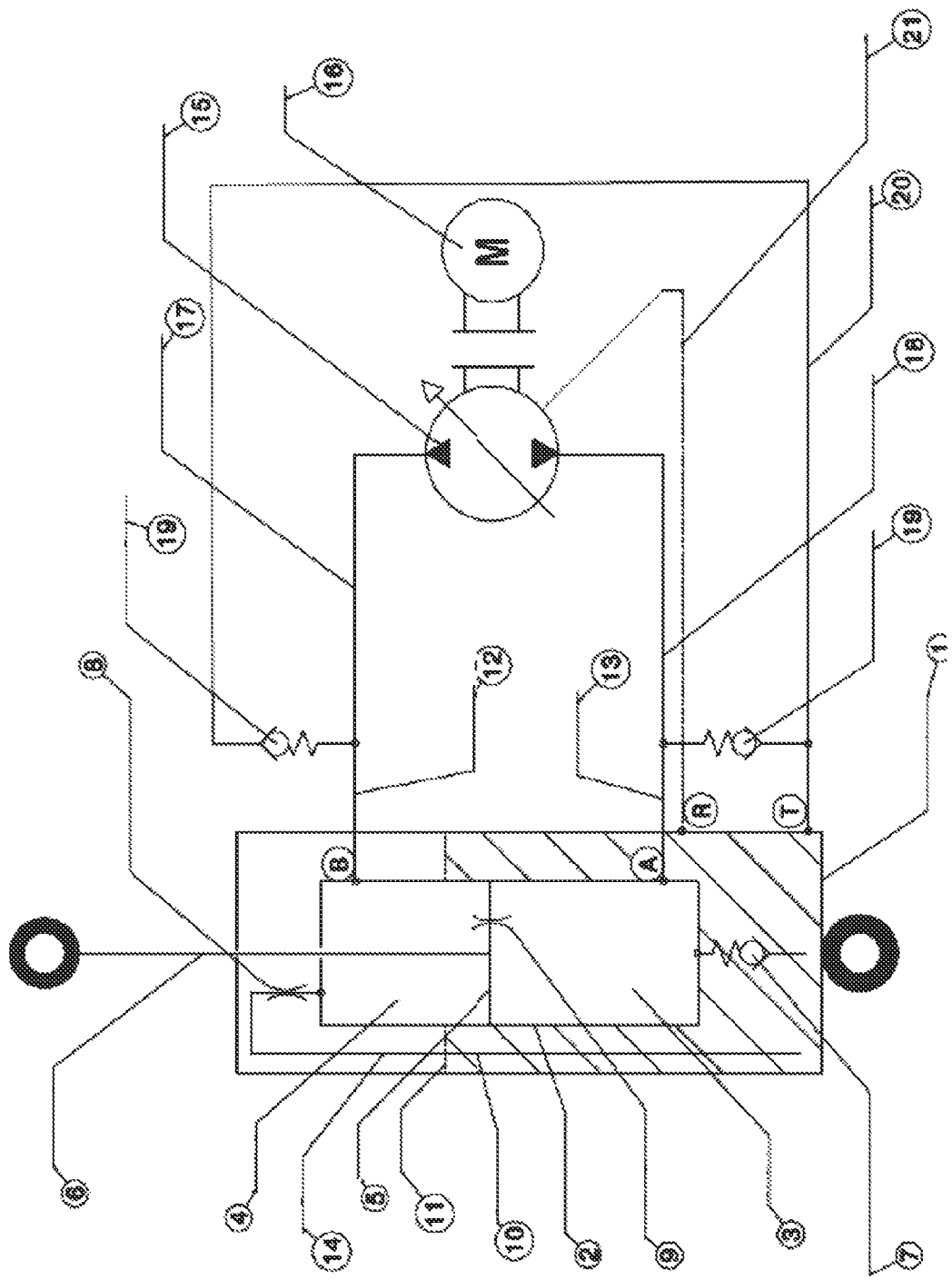
FIG. 4 shows a third embodiment of a shock absorber according to the invention.

In the embodiment according to FIG. 4, provided to control the flow resistance of the working medium in the valve arrangement 9 of the piston 5, is a hydraulic pump drive which, in this case, consists of a controllable pump 15 and a pump motor 16. The pump 15 is reversible so that it can pump oil out of the lower chamber 3 into the upper chamber 4 of the inner tube 2 and also in the opposite direction. A pump 15 of this type can increase or reduce the quantity of oil exchanged at a defined stroke of the piston 5 inside the inner tube 2 between the lower chamber 3 and the upper chamber 4. On the one hand, this produces an increase/decrease in the shock absorber forces against the introduction of the oil, and, on the other hand, with this embodiment, when a shock absorber of this type is used on a seat, the height of the seat can be corrected or a temporary leveling out of the shock absorber can be performed in general.

Since, in the case of pump systems, a particular leakage rate always has to be taken into account, provided in the embodiment according to FIG. 4, is a leakage line 21 by which oil escaping from the pump 15 is returned to the container 1 acting as a tank for the oil.

Furthermore, this embodiment of FIG. 4 also has a re-suctioning line 20 which can supply the pump 15 with the optionally necessary quantity of re-suctioned oil during operation. In this respect, this re-suctioning line 20 has connections to the pressure lines 17 and 18, these being separated from each other by non-return valves 19.

Figure 5:
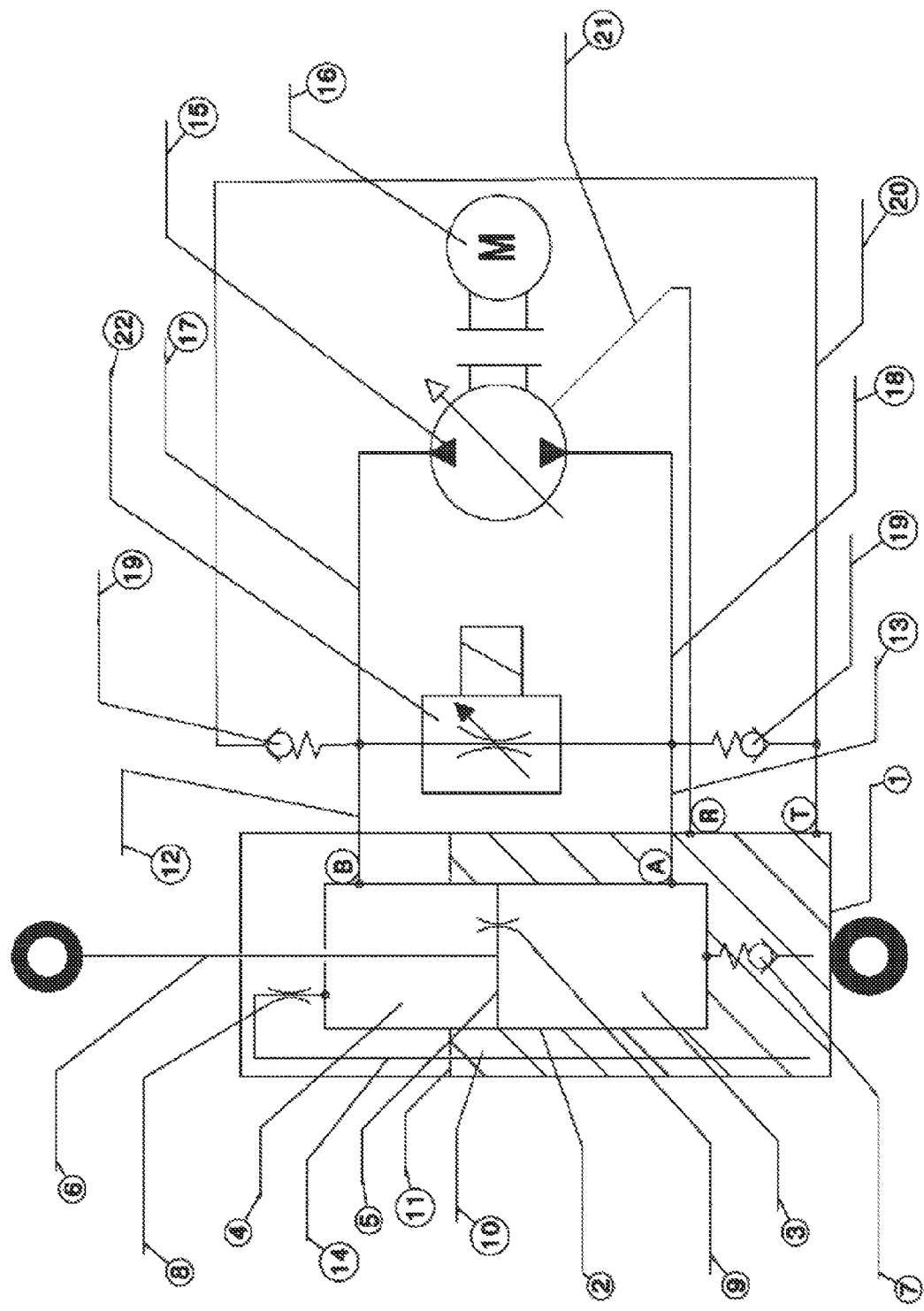
FIG. 5 shows a fourth embodiment of a shock absorber according to the invention.

Further, all the embodiments of FIGS. 3 to 5 also have an ascending pipe 14 which is arranged at the upper end of the inner tube 2 and projects above an oil sump level 11 into the oil sump 10 inside the container 1. This ascending main 14 is used so that during an external operation of the shock absorber, during which the quantity of oil is exchanged between the lower chamber 3 and the upper chamber 4 by a hydraulic pump, no cavitation occurs. Cavitations of this type would be disadvantageous to the mode of operation of the shock absorber. Furthermore, even during external operation, this ascending pipe 14 guarantees the provision of a closed oil circuit.

Figure 6:
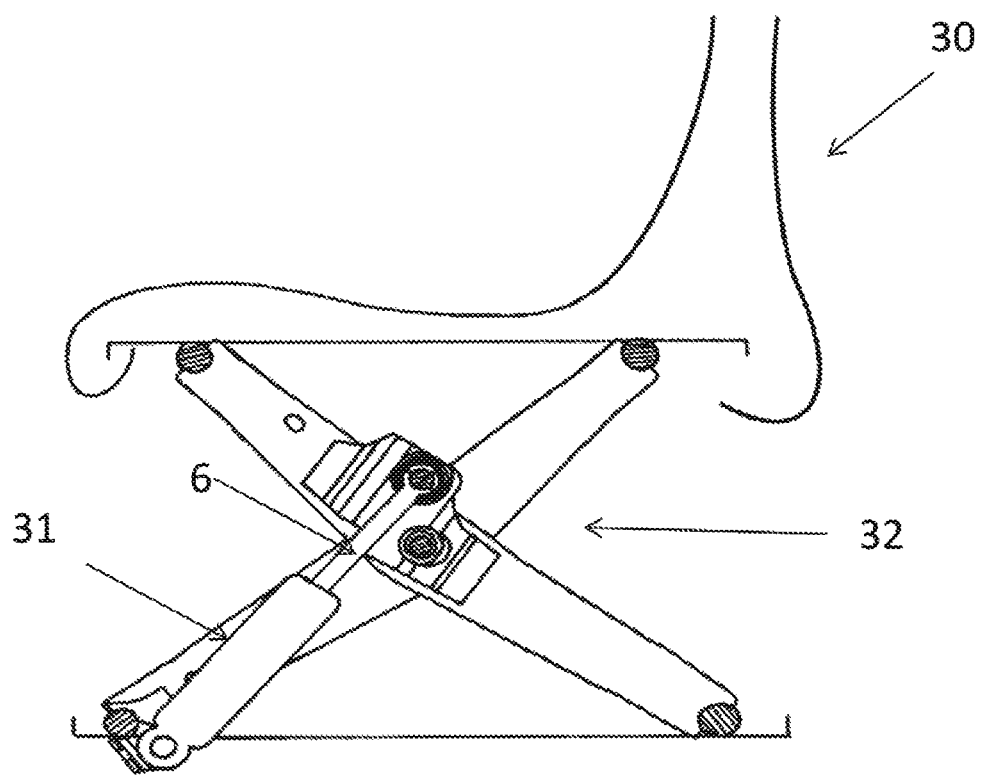
FIG. 6 shows a vehicle seat with a suspension, into which seat a shock absorber according to the invention has been fitted.

FIG. 6 shows a vehicle seat 30 with a suspension 32, the vibrations of which are damped by a shock absorber 31 according to the invention.

LIST OF REFERENCE NUMERALS 1 housing
2 inner tube
3 chamber
4 chamber
5 piston
6 piston rod
7 valve system
8 valve system
9 valve system
10 oil sump
11 oil sump level
12 connection element
13 connection element
14 ascending pipe
15 pump
16 motor
17 pressure line
18 pressure line
19 non-return valve
20 re-suctioning line
21 leakage line
22 proportional flow regulation valve

What is claimed is:
1. A shock absorber comprising:
a) a housing;
b) an inner tube arranged in the housing;
c) a piston rod immersing into the inner tube;
d) a piston which is arranged at the end of the piston rod immersing into the inner tube and which divides the interior of the inner tube into a lower chamber and an upper chamber;
e) a first valve arrangement, which is arranged on the piston and by which a working medium received in the inner tube can flow out of the lower chamber into the upper chamber and vice versa, as the piston travels in the inner tube;
f) a second valve arrangement, which is arranged at an upper end of the inner tube and by which the working medium received in the inner tube can only flow out of the upper chamber of the inner tube and directly into the interior of the housing acting as a tank for the working medium via an ascending pipe, as the piston travels in the inner tube;
g) a third valve arrangement, which is arranged at a lower end of the inner tube and by which the working medium received in the interior of the housing acting as a tank can only flow directly into the lower chamber of the inner tube and out of the interior of the housing acting as a tank, as the piston travels in the inner tube;
h) a first connection element, wherein the first connection element is in fluid communication with the lower chamber of the inner tube;
i) a second connection element, wherein the second connection element is in fluid communication with the upper chamber of the inner tube;
j) a means for controlling a flow resistance of the working medium in the first valve arrangement, wherein the first and second connection elements are separately connected to the means for controlling a flow resistance, wherein provided as the means for controlling the flow resistance of the working medium in the first valve arrangement is a hydraulic pump drive that is arranged between a lower pressure line connected to the first connection element and an upper pressure line connected to the second connection element; and
k) the ascending pipe projects into the working medium received in the housing and by which the working medium can be transferred from the housing acting as a tank into the upper chamber of the inner tube, wherein the ascending pipe forms a closed circuit for the working fluid between the lower chamber and the upper chamber to prevent cavitation.

2. The shock absorber according to claim 1, wherein a magnetic valve is arranged between the lower pressure line connected to the first connection element and the upper pressure line connected to the second connection element.

3. The shock absorber according to claim 1, wherein a proportional flow regulation valve is arranged between the lower pressure line connected to the first connection element and the upper pressure line connected to the second connection element.

4. The shock absorber according to claim 1, wherein the hydraulic pump drive is combined with a valve system, in particular, one of a magnetic valve and a proportional flow regulation valve.

5. The shock absorber according to claim 1, wherein the hydraulic pump drive has a controllable pump and a motor for the pump.

6. The shock absorber according to claim 1, wherein a leakage line for the working medium is provided between the housing acting as a tank for the working medium and the hydraulic pump drive.

7. The shock absorber according to claim 1, wherein a re-suctioning line for the working medium is provided between the housing acting as a tank for the working medium and the lower pressure line and/or the upper pressure line.

8. The shock absorber according to claim 7, wherein a non-return valve is arranged between the re-suctioning line and the lower pressure line and/or the upper pressure line.

9. A shock absorber comprising:
a) a housing;
b) an inner tube arranged in the housing;
c) a piston rod immersing into the inner tube;
d) a piston which is arranged at the end of the piston rod immersing into the inner tube and which divides the interior of the inner tube into a lower chamber and an upper chamber,
e) a first valve arrangement, which is arranged on the piston and by which a working medium received in the inner tube can flow out of the lower chamber into the upper chamber and vice versa, as the piston travels in the inner tube;
f) a second valve arrangement, which is arranged at an upper end of the inner tube and by which the working medium received in the inner tube can only flow out of the upper chamber of the inner tube and directly into the interior of the housing acting as a tank for the working medium via an ascending pipe, as the piston travels in the inner tube;

g) a third valve arrangement, which is arranged at a lower end of the inner tube and by which the working medium received in the interior of the housing acting as a tank can only flow directly into the lower chamber of the inner tube and out of the interior of the housing acting as a tank, as the piston travels in the inner tube;

h) a first connection element, wherein the first connection element is connected to the lower chamber of the inner tube;

i) a second connection element, wherein the second connection element is connected to the upper chamber of the inner tube;

j) a means for controlling a flow resistance of the working medium in the first valve arrangement, wherein the first and second connection elements are separately connected to the means for controlling a flow resistance, wherein provided as the means for controlling the flow resistance of the working medium in the first valve arrangement is a hydraulic pump drive that is arranged between a lower pressure line connected to the first connection element and a upper pressure line connected to the second connection element, wherein a re-suctioning line for the working medium is provided between the housing acting as a tank for the working medium and the lower pressure line and/or the upper pressure line; and k) the ascending pipe which projects into the working medium received in the housing and by which working medium can be transferred from the housing acting as a tank into the upper chamber of the inner tube, wherein the ascending pipe forms a closed circuit for the working fluid between the lower chamber and the upper chamber to prevent cavitation.

* * * * *